Patented Sept. 26, 1939

2,174,023

UNITED STATES PATENT OFFICE 2,174,023

RECOVERY OF VALUABLE PRODUCTS FROM SPENT SODA USED IN PETROLEUM REFINING

Hans G. Vesterdal, Linden, N. J., assignor to Standard Oil Development Company, a corporation of Delaware No Drawing. Application November 30, 1937, Serial No. 177,384

3 Claims. (Cl. 260—504)

The present invention relates to a method for recovering valuable products from the residual materials resulting from the neutralization or sweetening of an acid treated petroleum oil. Specifically it relates to the recovery of improved wetting agents from such materials which may be suitable for use in soluble oils, cutting oils, textile oils, dust laying compositions, spray oils, fire foam making materials, asphalt emulsions and in fact in any manner requiring the use of a material having good wetting power.

The residual materials from which such valuable products may be produced may be obtained as a result of the treatment of most any acid treated petroleum oil as for instance a cracked distillate such as a heating oil distillate. When such a material is subjected to an acid treatment to remove oxidizable impurities a certain amount of acid remains in the treated oil and it is customary to remove or neutralize the acid content thereof by washing with water and by treatment with a neutralizing agent such as sodium carbonate. As a result of the "soda wash" residual materials are obtained which contain water, inorganic salts and some portions of the treated oil. It has been customary to discard this residue, but it has now been discovered that valuable products may be cheaply recovered therefrom.

According to the method of this invention, the residue, normally designated as spent soda, is removed from the treating zone and its alkalinity reduced by bubbling through it carbon dioxide gas or a carbon dioxide containing gas such as flue gas. This treatment is continued until a substantial amount of free sodium hydroxide or sodium carbonate in the spent soda is transformed to sodium bicarbonate and the spent soda residue separates into layers. The bottom layer, containing water and substantially all the inorganic salts, is discarded. The top layer, which is an oil or oil emulsion, may then be subjected to further treatment to obtain therefrom the wetting agents above mentioned and usually an additional quantity of the petroleum oil originally subjected to the neutralization step. In some instances the procedure is facilitated somewhat by adding water insoluble solvents, such as naphtha or chlorinated solvents, to the spent soda before treatment.

The desired products may be obtained from the top layer in many ways, as for example, by vacuum distillation, by dissolving in dilute alcohol and extraction with naphtha or by dissolving in methyl alcohol to remove dark colored bodies, diluting with water and then extracting with naphtha or another water immiscible solvent to remove the oil content. In the latter case, if higher alcohols are used as solvents, the alcoholic solutions may have to be chilled before the impurities imparting color to the material will be precipitated. The wetting agents being soluble in the alcoholic solvents may be recovered by evaporation and the oil may be removed from its solvent material in like manner or by vacuum distillation.

It has been estimated that when the spent soda residue is obtained from the neutralization of an acid treated cracked distillate such as a heating oil distillate, about six gallons of the distillate and one hundred pounds of the wetting agent may be recovered from each one hundred gallons of spent soda treated in accordance with the foregoing procedure. The following Examples 2 and 3 are illustrative of the method and the results thereof, while Example 1 indicates the normal effect produced by use of the spent soda residue when used as a wetting agent without treatment according to the invention. The wetting numbers indicated were obtained by the "I. G. method" according to which the wetting power is measured by the time taken for a standard cloth disk, one inch in diameter, to sink in a 0.2% solution of a wetting agent in distilled water at 25° C.

Example 1

25 cc. of spent soda from the neutralization of a cracked heating oil distillate were evaporated to dryness with the recovery of 4.3 gms. (17.2 gms./100 cc.) of a soft, dark colored paste. A 0.2% solution of this paste in distilled water indicated a wetting number for the material of 398 seconds.

Example 2

300 cc. of spent soda were saturated with $CO_2$. On standing for one hour 230 cc. of a light colored salt solution precipitated and was discarded. The material remaining (70 cc.) was diluted with 100 cc. of 50% isopropyl alcohol and the diluted material extracted four times with 54° (A. P. I.) naphtha, 50 cc. of naphtha being used for each extraction, to remove the oil content. Upon evaporation of the raffinate 19.2 gms. (6.4 gms./100 cc.) of a dark brown powdery material was obtained which when tested showed an I. G. wetting number of 85 seconds.

From the extract was obtained 23 gms. of a dark colored oil which when subjected to vacuum distillation at 500° F., yielded 20 gms.

(6.67 gms./100 cc.) of the treated heating oil distillate.

Example 3

300 cc. of spent soda were saturated with $CO_2$, and 245 cc. of salt solution was separated out and discarded. To the remaining material, 200 cc. of 95% methanol were added and a layer of heavy oil or sludge separated out. The alcoholic solution was then evaporated to dryness to obtain 20 gms. (6.7 gms./100 cc.) of a light brown paste which upon test demonstrated an I. G. wetting number of 134 seconds.

The foregoing description and examples have been set forth only for the purpose of illustrating the invention and the disclosure is not to be understood to be limited except by the appended claims in which it is intended to claim all novelty as broadly as the prior art permits.

I claim:

1. A method of recovering valuable products from residual materials obtained from the neutralization of an acid oil with alkali materials, comprising treating said residual materials with a gas containing carbon dioxide; continuing such treatment to substantially remove free alkalies in the residual material as bicarbonates, and to produce a separation of said residual material into an oily layer and an aqueous layer containing said bicarbonates; and separately recovering an oil and a wetting agent from said oily layer.

2. A method according to claim 1 in which said gas containing carbon dioxide is flue gas.

3. A method of recovering valuable products from residual materials obtained from the neutralization of an acid oil with sodium hydroxide, comprising treating said residual materials with a gas containing carbon dioxide; continuing such treatment to substantially remove free sodium hydroxide and sodium carbonate as sodium bicarbonate, and to produce a separation of said residual material into an oily layer and an aqueous layer containing sodium bicarbonate; and separately recovering an oil, and a wetting agent from said oily layer.

HANS G. VESTERDAL.